US012695780B2

(12) United States Patent
Alderman et al.

(10) Patent No.: US 12,695,780 B2
(45) Date of Patent: Jul. 28, 2026

(54) CONTEXTUAL WEAKNESS SCORING DURING NETWORK PENETRATION TESTING

(71) Applicant: Horizon 3 AI, Inc., Dover, DE (US)

(72) Inventors: Robert George Alderman, Lafayette, CO (US); Zachary Daniel Hanley, Apex, NC (US)

(73) Assignee: Horizon 3 AI, Inc., Dover, DE (US)

( * ) Notice: Subject to any disclaimer, the term of this patent is extended or adjusted under 35 U.S.C. 154(b) by 0 days.

(21) Appl. No.: 18/955,492

(22) Filed: Nov. 21, 2024

(65) Prior Publication Data

US 2026/0142998 A1 May 21, 2026

(51) Int. Cl.
H04L 9/40 (2022.01)
(52) U.S. Cl.
CPC ................................. H04L 63/1433 (2013.01)
(58) Field of Classification Search
CPC ............. H04L 63/1433; H04L 63/1483; H04L 63/1416; H04L 63/1441; H04L 63/205; H04L 63/1425; H04L 63/145; H04L 63/1466; H04L 63/1475
See application file for complete search history.

(56) References Cited

U.S. PATENT DOCUMENTS 8,356,353 B2 * 1/2013 Futoransky ............. H04L 43/50
726/25
12,015,631 B2 6/2024 Morgan 2009/0007270 A1 * 1/2009 Futoransky ......... H04L 63/1433
726/25
2012/0124671 A1 * 5/2012 Fritzson ................. H04L 51/046
726/26
2019/0149572 A1 * 5/2019 Gorodissky ............. G06F 21/55
726/25

(Continued)

FOREIGN PATENT DOCUMENTS

CN 117349843 A * 1/2024 .......... G06F 21/577

OTHER PUBLICATIONS

S. Jajodia, S. Noel, P. Kalapa, M. Albanese and J. Williams, "Cauldron mission-centric cyber situational awareness with defense in depth," 2011—MILCOM 2011 Military Communications Conference, Baltimore, MD, USA, 2011, pp. 1339-1344, (Year: 2011).*

*Primary Examiner* — Khalid M Almaghayreh
(74) *Attorney, Agent, or Firm* — Flare IP PLLC

(57) ABSTRACT

An autonomous pentesting agent may execute an autonomous pentest of a network including a first network asset and additional network assets that are downstream from the first network asset within attack paths of the autonomous pentest. The autonomous pentesting agent may gain unauthorized access to the first network asset, and, based on accessing the first network asset, gain unauthorized access to the additional network assets. The autonomous pentesting agent may generate, as part of the autonomous pentest, scores for the first network asset and the additional network assets. A first score for the first network asset may be based on a first weakness score of the first network asset and on additional weakness scores corresponding to the additional network assets that are downstream from the first network asset. The autonomous pentesting agent may output, based on the autonomous pentest, a ranking of network assets based on the scores.

20 Claims, 6 Drawing Sheets

(56)           References Cited

U.S. PATENT DOCUMENTS

| | | | | |
|---|---|---|---|---|
| 2021/0105294 A1* | 4/2021 | Kruse | ................. | H04L 63/1416 |
| 2021/0194883 A1* | 6/2021 | Badhwar | ............... | H04L 63/107 |
| 2022/0201042 A1* | 6/2022 | Crabtree | ............ | H04L 63/1425 |
| 2023/0336581 A1* | 10/2023 | Dunn | .................... | G06F 21/577 |
| 2024/0037245 A1* | 2/2024 | Kahan | ................ | H04L 63/1433 |
| 2024/0411894 A1* | 12/2024 | Shua | ..................... | G06F 21/577 |
| 2025/0071134 A1* | 2/2025 | Singh | ................... | H04L 63/205 |
| 2025/0310351 A1* | 10/2025 | Aphale | .............. | H04L 63/1416 |
| 2025/0343818 A1* | 11/2025 | Immesoete | ........ | H04L 63/1433 |

* cited by examiner

Downstream Assets

Network 110

Autonomous
Pentesting Agent
105

Pentesting
Attack Path 330

Pentesting
Attack Path 335

Network Asset
305

345

350

Network Asset
310

Score

Context Score 355

Weakness Score
360

Score

Network Asset
325

Downstream
Score(s) 365

Network Asset
315

Score

Network Asset
320

Score

Score(s)

Compromise
Event(s) 375

Compromise
Event(s) 370

Score(s)

300

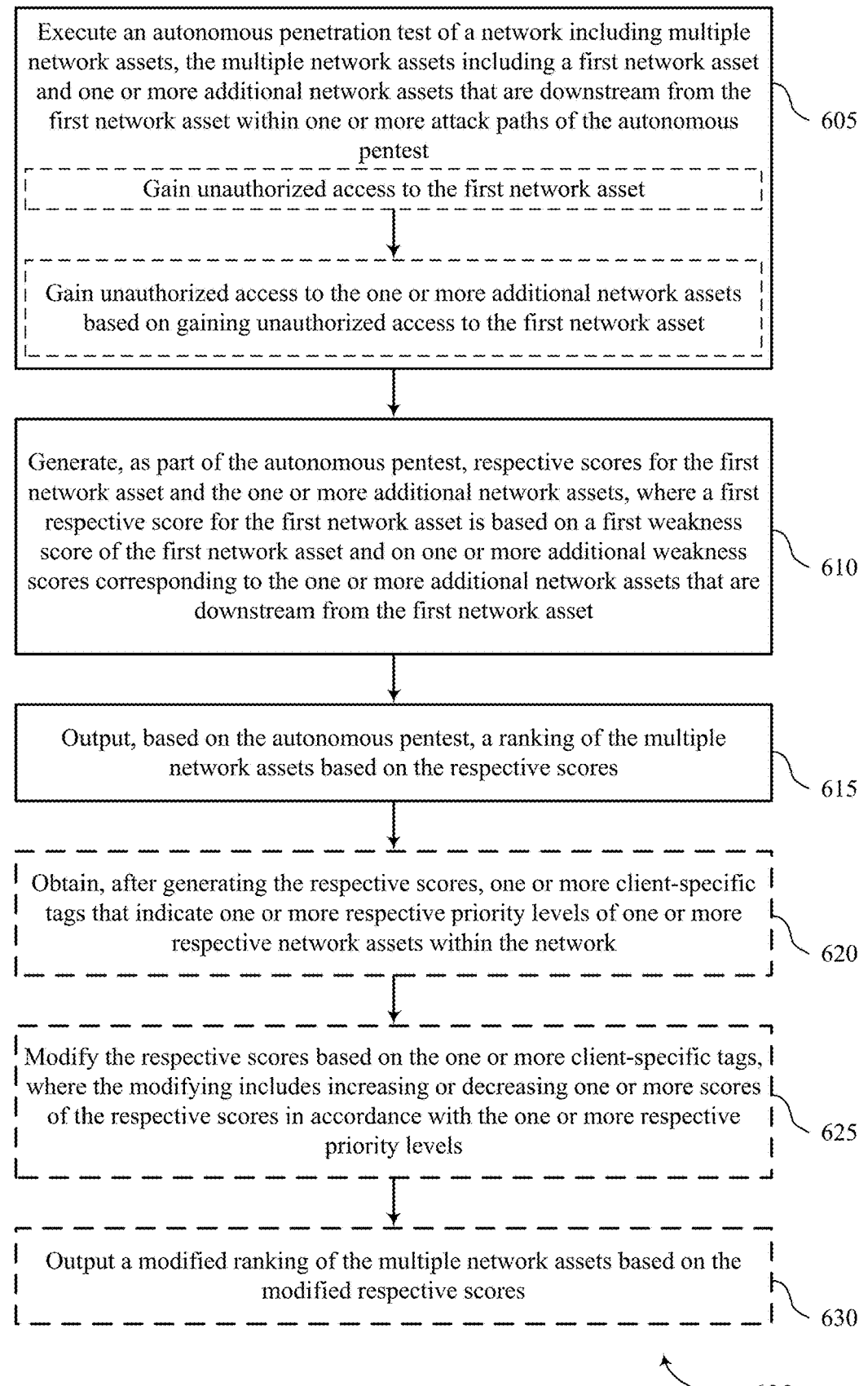

Execute an autonomous penetration test of a network including multiple network assets, the multiple network assets including a first network asset and one or more additional network assets that are downstream from the first network asset within one or more attack paths of the autonomous pentest Gain unauthorized access to the first network asset Gain unauthorized access to the one or more additional network assets based on gaining unauthorized access to the first network asset

605

Generate, as part of the autonomous pentest, respective scores for the first network asset and the one or more additional network assets, where a first respective score for the first network asset is based on a first weakness score of the first network asset and on one or more additional weakness scores corresponding to the one or more additional network assets that are downstream from the first network asset

610

Output, based on the autonomous pentest, a ranking of the multiple network assets based on the respective scores

615

Obtain, after generating the respective scores, one or more client-specific tags that indicate one or more respective priority levels of one or more respective network assets within the network

620

Modify the respective scores based on the one or more client-specific tags, where the modifying includes increasing or decreasing one or more scores of the respective scores in accordance with the one or more respective priority levels

625

Output a modified ranking of the multiple network assets based on the modified respective scores

CONTEXTUAL WEAKNESS SCORING DURING NETWORK PENETRATION TESTING

BACKGROUND

In networking, penetration testing or "pentesting" refers to conducting security operations that simulate a cybersecurity attack in order to identify vulnerabilities in a network. The goal of pentesting is to mimic the actions of a malicious actor and discover loopholes or other vulnerabilities before they can be exploited. Pentesting may include techniques such as scanning for vulnerabilities, testing system configurations and security protocols, and attempting controlled attacks to evaluate defense mechanisms within a network. Network administrators can remediate vulnerabilities uncovered during pentesting to prevent malicious actors from compromising network security using those vulnerabilities. Practicing regular pentesting can aid in maintaining high security standards, protecting sensitive data, and ensuring the continuity of network services.

SUMMARY

The described techniques relate to improved methods, systems, devices, and apparatuses that support contextual weakness scoring during network penetration testing ("pentesting").

A method for contextual weakness scoring by an apparatus is described. The method may include executing an autonomous pentest of a network comprising a plurality of network assets, the plurality of network assets comprising a first network asset and one or more additional network assets that are downstream from the first network asset within one or more attack paths of the autonomous pentest, wherein executing the autonomous pentest may include operations, features, means, or instructions for gaining unauthorized access to the first network asset and gaining unauthorized access to the one or more additional network assets based at least in part on gaining unauthorized access to the first network asset, generating, as part of the autonomous pentest, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset, and outputting, based at least in part on the autonomous pentest, a ranking of the plurality of network assets based at least in part on the respective scores.

An apparatus for contextual weakness scoring is described. The apparatus may include one or more memories storing processor executable code, and one or more processors coupled with the one or more memories. The one or more processors may individually or collectively be operable to execute the code to cause the apparatus to execute an autonomous pentest of a network comprising a plurality of network assets, the plurality of network assets comprising a first network asset and one or more additional network assets that are downstream from the first network asset within one or more attack paths of the autonomous pentest, wherein, to execute the autonomous pentest, the one or more processors are individually or collectively operable to execute the code to cause the apparatus to gain unauthorized access to the first network asset and gain unauthorized access to the one or more additional network assets based at least in part on gaining unauthorized access to the first network asset, generate, as part of the autonomous pentest, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset, and output, based at least in part on the autonomous pentest, a ranking of the plurality of network assets based at least in part on the respective scores.

Another apparatus for contextual weakness scoring is described. The apparatus may include means for executing an autonomous pentest of a network comprising a plurality of network assets, the plurality of network assets comprising a first network asset and one or more additional network assets that are downstream from the first network asset within one or more attack paths of the autonomous pentest, wherein the means for executing the autonomous pentest comprise means for gaining unauthorized access to the first network asset and means for gaining unauthorized access to the one or more additional network assets based at least in part on gaining unauthorized access to the first network asset, means for generating, as part of the autonomous pentest, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset, and means for outputting, based at least in part on the autonomous pentest, a ranking of the plurality of network assets based at least in part on the respective scores.

A non-transitory computer-readable medium storing code for contextual weakness scoring is described. The code may include instructions executable by one or more processors to execute an autonomous pentest of a network comprising a plurality of network assets, the plurality of network assets comprising a first network asset and one or more additional network assets that are downstream from the first network asset within one or more attack paths of the autonomous pentest, wherein the instructions to execute the autonomous pentest are executable to gain unauthorized access to the first network asset and gain unauthorized access to the one or more additional network assets based at least in part on gaining unauthorized access to the first network asset, generate, as part of the autonomous pentest, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset, and output, based at least in part on the autonomous pentest, a ranking of the plurality of network assets based at least in part on the respective scores.

BRIEF DESCRIPTION OF THE DRAWINGS

FIG. 6 shows a flowchart illustrating methods that support contextual weakness scoring during network pentesting in accordance with aspects of the present disclosure.

DETAILED DESCRIPTION

Figure 1:
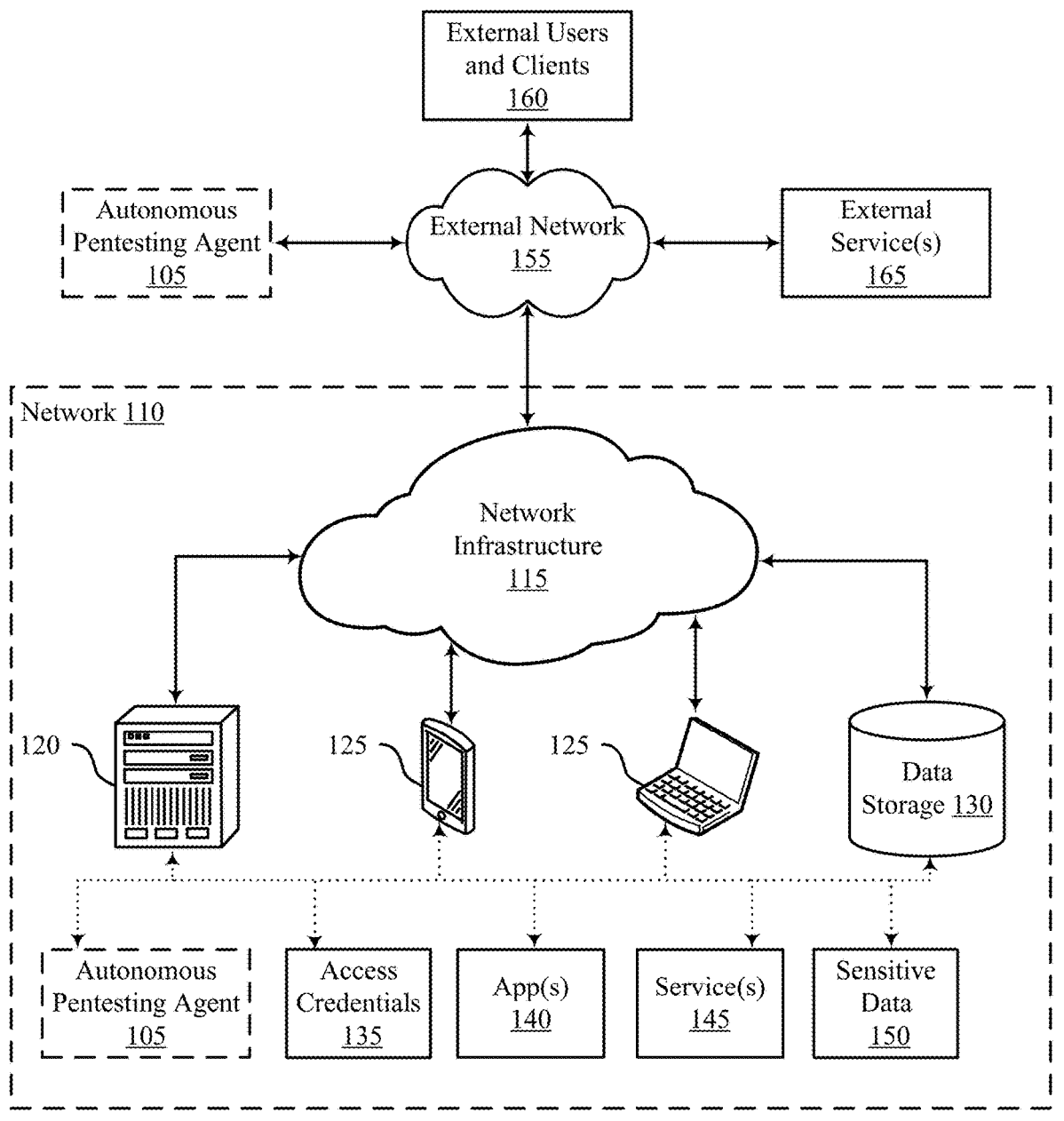
FIG. 1 shows an example of a computing environment that supports contextual weakness scoring during network penetration testing (pentesting) in accordance with aspects of the present disclosure.

An agent may perform penetration testing or "pentesting" of a network and identify, as a result of the pentesting, weaknesses, such as one or more weaknesses of a network asset, within the network. The pentest may involve attempting to gain access to assets within the network. For example, an agent may attempt to hack, compromise, breach, or otherwise gain access to assets associated with the network. "Assets" as used herein may be used interchangeably with "resources" or "network assets" and may refer to user credentials, confidential client or customer information, services running on a network, or devices (e.g., mobile devices, computers, servers) that are part of or have access to a network. Additionally, "access" as used herein may refer to write access. In other words, the agent may gain access to an asset when the agent is capable of modifying, deleting, or creating files, data, or both on or within the asset.

In some cases, pentests may be performed manually. For example, a human in a security team of an organization of the network or of a third-party may attempt to gain access to the assets within the network. Alternatively, pentests may be automated. That is, an automated tool may include hard-coded functions or attack paths that are executed internally at the network or externally (e.g., via the Internet). After performing the pentest, the human or automated tool may provide or output reports that include information about the network to a client. For example, the report may include or identify network weaknesses, asset risk levels, or the like. Identifying which of the weaknesses or risks are more important or severe (e.g., relative to other identified weaknesses and risks) may aid a client in performing risk management procedures, such as in determining which weaknesses or risks to address first. As an example, the client may have a limited quantity of resources to perform risk management procedures and may focus the limited quantity of resources on the weaknesses or risks that are identified as being relatively more important or severe. Reports provided after pentests performed by the human or automated tool may rank weaknesses or assets based on a likelihood of risk and potential impact if a particular weakness were to be exploited or an asset were to be compromised. The ranking may be based on a scoring system, such as an algorithm, that may generate a score for a given weakness or asset based on severity. However, human or automated agents may lack capabilities to accurately identify relative importance levels of different weaknesses or risks as human or automated agents may fail to consider context of assets within the network.

According to techniques herein, an autonomous pentesting agent may perform a pentest of a network and provide reports ranking the assets of the network autonomously. For example, the autonomous pentesting agent may perform an autonomous pentest and, during the pentest, gain access to multiple network assets. In some examples, the autonomous pentesting agent may gain access to some assets via other assets to which the pentest has already gained access. That is, the autonomous pentesting agent may leverage access to a first or initially accessed asset to access one or more additional or subsequent assets. Such additional assets that are accessed via the first asset may be considered "downstream" from the first asset. In such examples, the autonomous pentesting agent may assign a score (e.g., a context score) to the first asset that accounts for score(s) (e.g., weakness score(s)) of the one or more additional assets. In other words, the autonomous pentesting agent described herein may generate scores for network assets that are based on a score of a given asset (e.g., an individual weakness score) as well as scores of assets that are downstream from the given asset. The autonomous pentesting agent may provide a report that ranks the network assets based on the scores that combine individual scores with downstream scores. In such examples, the report may be more accurate compared to a report generated based on a manual or automated pentest.

FIG. 1 illustrates an example of a computing environment 100 that supports contextual weakness scoring during network pentesting during network pentesting in accordance with aspects of the present disclosure. The computing environment 100 may include an autonomous pentesting agent 105 that performs an autonomous pentest of a network 110. The network 110 may include one or more devices or systems, such as a network infrastructure 115, server 120, computing devices 125, data storage 130, or any combination thereof. The devices or systems of the network 110 may be configured to access or provide various network information and services, such as access credentials 135, app(s) 140, service(s) 145, sensitive data 150, or any combination thereof.

The network 110 may allow the server 120, the computing devices 125, and the data storage 130 to communicate (e.g., exchange information) with one another. For example, the network infrastructure 115 may include any quantity of communications links and any quantity of hubs, bridges, routers, switches, ports, or other physical or logical network components that support communication between the server 120, computing devices 125, and data storage 130 of the network 110 as well as communication between the network 110 (e.g., the private network) and an external network 155 (e.g., the Internet). The network 110 may include aspects of one or more wired networks, one or more wireless networks (e.g., cellular networks), or any combination thereof. The network 110 may include aspects of one or more public networks or private networks, as well as secured or unsecured networks, or any combination thereof. For example, the network 110 may be an example of a private network that includes one or more public-facing or external assets that are accessible via an external network 155. As an example, the external network 155 may refer to the Internet, and users, such as external users and clients 160, may access the network 110 via the external network 155 through a website or application that is on the external network 155. For example, the external users and clients 160, the external service(s) 165, or both may access network information and services via the external network 155 (e.g., via the Internet), including the access credentials 135, app(s) 140, service(s) 145, and sensitive data 150.

The network 110 may be accessible via one or more hosts. For example, hosts may be examples of real or virtual machines that are connected to and capable of accessing the network 110. Real machines may refer to machines having or made up of hardware components including a central processing unit (CPU), memory, hard drive, or the like, such as physical or tangible computers or servers (e.g., the server 120, the computing devices 125, etc.). Virtual machines may refer to software within or running on a physical computer or server using portions of the CPU, memory, hard drive, or the like of the physical computer or server. A physical computer or server may include or support multiple virtual machines, such as multiple tenants (e.g., in a multi-tenant environment). The server 120 and the computing devices 125 may be examples of hosts. Hosts may communicate data with other devices within the network 110 and outside of the network (e.g., with devices in an external network 155). For example, the server 120 may send data to and receive data from one or more of the computing devices 125. Additionally, or alternatively, hosts may access resources of the network 110, including the access credentials 135, app(s) 140, service(s) 145, or sensitive data 150. As used herein, hosts may refer to web hosts, cloud hosts, virtual hosts, remote hosts, or the like.

Hosts may be examples of and include network assets. As used herein, network assets refer to machines that include network shares. For example, network assets may be examples of machines (e.g., real or virtual machines) that include shares of the network 110, such as file sharing systems. Network assets may be obtained and utilized by attackers to compromise the network 110. The server 120, the computing devices 125, the data storage 130, and the access credentials 135, app(s) 140, service(s) 145, and sensitive data 150 accessible via the devices and systems of the network 110 may all be examples of network assets. For example, physical devices (e.g., servers, computing devices, data storage, etc.) and systems may be considered network assets as well as information, apps, and services accessible through physical devices and systems of the network 110.

Hosts may store, provide, or implement access credentials 135, app(s) 140, service(s) 145, sensitive data 150, or any combination thereof. In some cases, computing devices 125 on the network may access the one or more assets (e.g., access credentials 135, app(s) 140, service(s) 145, sensitive data 150, etc.) via the server 120 (e.g., via a host). Additionally, or alternatively, computing devices 125 may locally store or otherwise access the one or more assets of the network 110. For example, users of the network 110 may access app(s) 140 and service(s) 145 via the computing devices 125 directly or indirectly (e.g., via a connection between the computing devices 125 and the server 120).

The autonomous pentesting agent 105 may perform a pentest of the network 110. As used herein, a pentest or a "pentest" may refer to one or more security operations that simulate a cybersecurity attack in order to identify vulnerabilities in the network 110. The autonomous pentesting agent 105 may perform the pentest of the network 110 using one or more artificial intelligence (AI) models. For example, the autonomous pentesting agent 105 may be "autonomous," as the autonomous pentesting agent 105 may perform the pentest without a requirement of hard-coding, user inputs, or the like and, instead, by using the one or more AI models. The autonomous pentesting agent 105 may identify, via the pentest, security vulnerabilities of the network 110. An example of an output of the pentest may be described in greater detail elsewhere herein, including with reference to FIG. 2.

The autonomous pentesting agent 105 may, via the one or more AI models, determine and implement an attack path for a pentest. For example, the autonomous pentesting agent 105 may identify or select an asset of the network 110 to attempt to access initially and, from that asset, another asset to attempt to access, and so on. In other words, the autonomous pentesting agent 105 may use the one or more AI models to mimic decisions of an attacker. The one or more AI models may output a targeted asset of the network 110 to be subject to an access attempt by the autonomous pentesting agent 105 based on inputs including context of various assets in the network 110. In other words, the one or more AI models may output targeted assets based on the relative position of assets within the network 110, asset types, downstream assets (e.g., accessible after or through accessing a targeted asset), or the like.

The one or more AI models may be trained using data of previous pentests of the network 110 or other networks. For example, an autonomous pentesting service that deploys the autonomous pentesting agent 105 may train one or more AI models used by the autonomous pentesting agent 105 using tactics, techniques, and procedures (TTPs) of attackers (e.g., human or automated pentests), autonomous pentests performed on the network 110 previously or on other networks, or both. The autonomous pentesting agent 105 may perform improved pentests after the one or more AI models are trained using previous pentests of the network 110. That is, as the autonomous pentesting agent 105 learns more about the network 110, the autonomous pentesting agent 105 may perform pentests with higher performance levels (e.g., higher accuracy, higher quantities of potential attack paths, etc.).

In some cases, the pentest may be internal or external to the network 110. For example, the autonomous pentesting agent 105 may be deployed at a host device of the network 110 (e.g., deployed to the server 120 or computing devices 125). In such examples, the autonomous pentesting agent 105 may perform the pentest as an internal user of the network 110. Such internal pentests may be indicative of or emulate internal security threats to the network, such as from employees of an organization or an attacker that has otherwise obtained access to the network 110 internally. Alternatively, the autonomous pentesting agent 105 may be deployed at the external network 155. For example, the autonomous pentesting agent 105 may perform the pentest as an external user of the network 110, such as by accessing external or public-facing assets of the network 110 on the external network 155.

By performing the pentest autonomously via the autonomous pentesting agent 105, techniques described herein may support improved performance related to speed, identification of security vulnerabilities, and provision of remediation measures. For example, the pentest, when performed autonomously using the autonomous pentesting agent 105, may support improved performance and, by extension, improved security of the network 110 against cybersecurity attacks relative to hard-coded (e.g., automated) or manual (e.g., human operated) pentests.

As described herein, the autonomous pentesting agent 105 may score network assets of the network 110 based on individual and contextual weaknesses. By scoring the network assets based on contextual weaknesses, rather than individual weaknesses alone, techniques described herein may support improved network security and risk reporting, and may help with prioritization of security solutions for risk mitigation or prevention. For example, contextual scoring may convey (e.g., to a client) a more accurate representation of weaknesses or risk of different network assets within the network 110 through reporting or outputting including the scoring. As an example, the app(s) 140 may have a weakness score that is relatively low compared to the access credentials 135. However, an attacker may obtain access to the access credentials 135 through the app(s) 140. Accordingly, a contextual score of the app(s) 140 may reflect both the weakness score of the app(s) 140 themselves as well as the weakness score of the access credentials 135. Other scoring techniques may fail to convey this contextual importance of the app(s) 140 and, thus, a report that ranks weaknesses of different assets without considering context may fail to accurately rank the app(s) 140 relative to other assets in the network 110. Such an inaccuracy may lead to ineffectual security mitigations being applied to or prioritized for implementation at the network 110. The autonomous pentesting agent 105 advantageously may accurately identify a relative weakness or importance of each asset within the network 110 in accordance with a context of each asset within the network 110. This enables the ranking of the assets, as part of the results of the pentest, to be more accurate (e.g., relative to manual or automated scoring, or other scoring techniques). Additionally, by scoring the assets based on an autonomous pentest, the autonomous pentesting agent 105 may identify a greater quantity of assets, multiple weaknesses at each asset, or the like. That is, the autonomous pentest may be more thorough than the manual or automated pentests and, accordingly, may provide a more accurate and complete scoring (and ranking) for weaknesses or risks of assets within the network 110.

Figure 2:
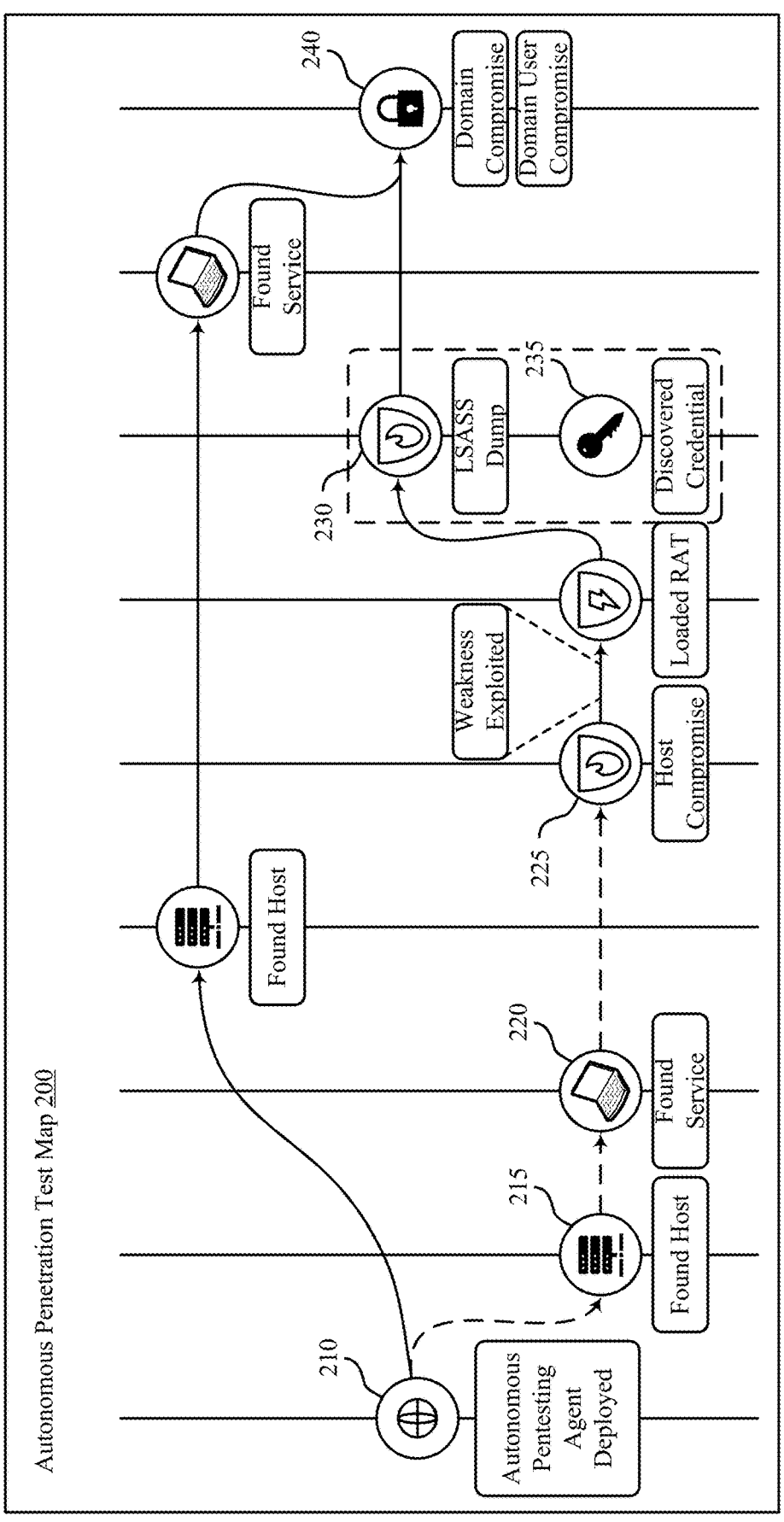
FIG. 2 shows an example of an autonomous pentest map that supports contextual weakness scoring during network pentesting in accordance with aspects of the present disclosure.

FIG. 2 shows an example of an autonomous pentest map 200 that supports contextual weakness scoring during network pentesting in accordance with aspects of the present disclosure. The autonomous pentest map 200 may be an example of an output or result of an autonomous pentest performed by an autonomous pentesting agent, such as a pentest performed by the autonomous pentesting agent 105 in the network 110 as described with reference to FIG. 1. The autonomous pentest map 200 may illustrate and describe an example of events of a pentest, including operations performed by and information obtained by the autonomous pentesting agent.

The autonomous pentest map 200 may include one or more types of events. For example, the autonomous pentest map 200 may include deployment 210 (e.g., of the autonomous pentesting agent), host identification 215, service identification 220, host compromise 225, deployment of an attacker tool 230 (e.g., a remote access tool (RAT), credential identification 235, and access 240 (e.g., to a domain, a domain user, or both). The autonomous pentest map 200 includes one possible attack path including two attack branches that is generated based on an autonomous pentest. However, it is understood that any quantity of possible attack paths having any quantity of possible attack branches may be output from an autonomous pentest. In other words, the autonomous pentest map 200 may include one or more attack paths having one or more respective attack branches. In some cases, dozens, hundreds, or thousands of possible attack paths, branches, or both may be generated based on the autonomous pentest. Additionally, it is understood that while the autonomous pentest map 200 shown in FIG. 2 displays one example of an autonomous pentest for illustration, other maps including various different events, hosts, attack paths, and attack branches may result from various autonomous pentests.

In the example of the autonomous pentest map 200, the autonomous pentesting agent may identify an attack path having two attack branches. As used herein, attack "path" may be understood to refer to a series of events, set in motion by the autonomous pentest agent, that lead to a compromise of one or more components or assets of a network. Additionally, "branches" or "chains" of an attack path may refer to one or more events occurring simultaneously or in parallel that lead to the compromise. As an example, in a first attack branch of the autonomous pentest map 200, the autonomous pentesting agent may identify a host, identify a service, and compromise the host (e.g., through the service). On the compromised host, the autonomous pentesting agent may exploit a weakness identified on the service running on the host to load a RAT and remotely control the compromised host. The autonomous pentesting agent pay perform, via the RAT, a Local Security Authority Subsystem Service (LSASS) dump, allowing the autonomous pentesting agent to discover a credential. The autonomous pentesting agent may use the credential in a different branch of the attack path. For example, in a second attack branch of the autonomous pentest map 200, the autonomous pentesting agent may identify a host and, through the identified host, a service. The autonomous pentesting agent may use the discovered credentials (e.g., of the first attack branch) at the service (e.g., of the second attack branch to obtain access 240 to the domain, domain user, or both.

An autonomous pentesting service may display the autonomous pentest map 200 such that compromised assets may be identified and security measures may be put in place. In some cases, the autonomous pentesting service may provide mitigation recommendations according to the autonomous pentest map 200. As an example, the autonomous pentest map 200 may identify a particular host or service as a security vulnerability for a network by tracing the access 240 backwards to a host identification 215 event. Accordingly, the autonomous pentesting service may provide a mitigation recommendation to be applied to the host involved in the host identification 215 event, such as according to how the host was identified or how access was obtained to the host at the host compromise 225 event. Similarly, the autonomous pentesting service may provide a mitigation recommendation to be applied to the service involved in the service identification 220 event.

The autonomous pentesting agent may support contextual scoring for network assets within a network. For example, the autonomous pentesting agent may provide a ranked list of network assets according to weaknesses or risks identified during an autonomous pentest. The autonomous pentesting agent may score assets according to the autonomous pentest map 200. For example, the autonomous pentesting agent may score an asset based on assets that are downstream from that asset, such as according to an attack path illustrated in the autonomous pentest map 200. That is, the autonomous pentesting agent may use the autonomous pentest map 200 to identify downstream assets and score upstream assets accordingly.

Figure 3:
FIG. 3 shows an example of a computing diagram that supports contextual weakness scoring during network pentesting in accordance with aspects of the present disclosure.

FIG. 3 illustrates an example of a computing environment 300 that supports contextual weakness scoring during autonomous pentesting in accordance with aspects of the present disclosure. The computing environment 300 may implement or be implemented by the computing environment 100, the autonomous pentest map 200, or both. For example, the computing environment 300 may illustrate a network 110 that includes one or more network assets, including a network asset 305, a network asset 310, a network asset 315, a network asset 320, and a network asset 325. The network assets may be examples of one or more devices or systems described with reference to FIG. 1, including the server 120, computing devices 125, data storage 130, access credentials 135, app(s) 140, service(s) 145, or sensitive data 150. Additionally, the computing environment 300 may include an autonomous pentesting agent 105, which may perform an autonomous pentest of the network 110. Although the autonomous pentesting agent 105 is shown as internal to the network 110 in the computing environment 300 of FIG. 3, the autonomous pentesting agent 105 may alternatively be external to the network 110 and access the network 110 via the Internet or another external network.

The autonomous pentesting agent 105 may attempt to gain access to the network assets during an autonomous pentest. During the autonomous pentest, the autonomous pentesting agent 105 may access network assets via one or more attack paths, including via a pentesting attack path 330 and via a pentesting attack path 335. While two attack paths are illustrated in the example of FIG. 3, it may be understood that the autonomous pentesting agent 105 may follow any number of attack paths during the autonomous pentest.

The attack paths may illustrate how the autonomous pentesting agent 105 accesses different assets within the network 110 during the autonomous pentest. For example, the autonomous pentesting agent 105 may access the network asset 305. Based on (e.g., during or after) accessing the network asset 305, the autonomous pentesting agent 105 may access the network asset 310 and the network asset 325. The autonomous pentesting agent 105 may access the network asset 315 based on accessing the network asset 310 and, finally, access the network asset 320 based on accessing the network asset 315. The network assets 310, 315, 320, and 325 may be considered "downstream" from the network asset 305.

In some examples, the pentesting attack paths may lead to compromise event(s). For example, the pentesting attack path 330 (e.g., assets 345) may lead to the compromise event(s) 370, and the pentesting attack path 335 (e.g., assets 350) may lead to the compromise event(s) 375. Compromising any of the network assets within a given attack path may lead to a compromise event in that attack path. The compromise events may be examples of the compromise events described with reference to FIG. 2. For example, the compromise events may be examples of host compromise, discovered credentials, deployment of attacker tools, domain compromise, domain user compromise, or the like.

As used herein, "impact" may be referred to as an outcome an attacker may achieve by exploiting a set of weaknesses or misconfigurations. As an example, a vulnerability on a network asset (e.g., a domain controller) may be exploited by an attacker to compromise the network 110 (e.g., obtain full domain compromise). In such an example, the compromise may be the impact of the vulnerability on the network asset. Impact may be used to translate a technical issue or vulnerability to a potential business impact. The impact may be relevant to scoring or ranking various vulnerabilities, misconfigurations, and other deficiencies that led to the impact. In some examples, "impact" may be simply accessing the network assets or, in some other examples, "impact" may refer to a compromise event that occurs based on gaining access. Examples of different impacts may be provided in greater detail elsewhere herein, including with reference to Table 1.

In some examples, the autonomous pentesting agent 105 may determine a downstream impact of network assets. A downstream impact may be an outcome achieved indirectly by stringing together a series of weaknesses or misconfigurations into an attack chain that ultimately leads to an impact. In the example of FIG. 3, the downstream impact may be the compromise event(s) that occur based on gaining access to various network assets in the pentesting attack paths. As an example, a user credential (e.g., login information) may be compromised to give an attacker initial access to the network 110. Using the user credential and the initial access, the attacker may exploit other weaknesses in the network 110 that may lead to further compromises and, eventually, to compromise event(s) (e.g., full domain compromise). In this example, the compromise event(s) impact is downstream of the initial network access. Downstream impacts may be relevant for scoring or ranking the upstream vulnerabilities in the attack path that ultimately led to the impact.

The autonomous pentesting agent 105 may determine a total downstream impact for a weakness by modeling the pentesting attack paths. For example, the autonomous pentesting agent 105 may model the pentesting attack path 330 and the pentesting attack path 335 as directed acyclic graphs (DAGs). In the DAGs, the nodes of the graph may represent assets and findings from the pentest, such as hosts, credentials, vulnerabilities, impacts, and other finding types. The edges of the DAGs may represent attack-chain dependencies between the nodes. For example, if a vulnerability is found on a host, then a dependency edge may be drawn from the vulnerability node to the host node, indicating that the discovery of the vulnerability depended first on the discovery of the host. In other words, the autonomous pentesting agent 105 may model dependencies between different network assets, weaknesses, and compromises that are in the pentesting attack paths in DAGs.

In some examples, the autonomous pentesting agent 105 may combine models of different attack paths into a single model. For example, the autonomous pentesting agent 105 may combine a model of the pentesting attack path 330 with a model of the pentesting attack path 335 to obtain a model of the autonomous pentest as a whole. Such a model may be referred to as a merged model or a merged DAG. The autonomous pentesting agent 105 may use the merged DAG to determine a total downstream impact for any given node. For example, the autonomous pentesting agent 105 may follow the edges of the merged model to all impacts discovered by the autonomous pentesting agent 105 that are downstream from the node. In the example of FIG. 3, the autonomous pentesting agent 105 may use the merged model to identify that the network asset 305 has a downstream impact of the network asset 310, the network asset 315, the network asset 320, the compromise event(s) 370, the network asset 325, and the compromise event(s) 375.

The network assets and the compromise event(s) may be associated with respective scores. The scores may be indicative of weakness scores or risk scores. In some examples, weakness scores and risk scores may be used interchangeably to refer to a level of security vulnerability of a network asset or a compromise event. Additionally, or alternatively, weakness scores may be understood as how easily the autonomous pentesting agent 105 gained access to a respective asset, while risk scores may be understood as how detrimental access to assets or occurrence of compromise event(s) are or would be to the network 110.

Based on the autonomous pentest and the merged model of the attack paths, the autonomous pentesting agent 105 may perform context scoring. For example, the autonomous pentesting agent 105 may determine a score for each node in the merged model (e.g., a weakness score for each network asset). Additionally, the autonomous pentesting agent 105 may determine scores associated with downstream impact for each node (e.g., downstream scores for each network asset). That is, the autonomous pentesting agent 105 may score each node based on the downstream impact associated with a given node if the node were to be compromised. The autonomous pentesting agent 105 may use the scores to rank each node (e.g., network asset) in the merged model.

In the example of FIG. 3, the network asset 305 may have a context score 355 that is based on a weakness score 360 and downstream score(s) 365. The weakness score 360 may be indicative of an individual weakness of the network asset 305. For example, the weakness score 360 may represent vulnerabilities or impacts of the network asset 305 taken alone (e.g., without consideration of the attack paths, downstream impact, etc.). Alternatively, the downstream score(s) 365 may be indicative of weakness scores of network assets, compromise event(s), or both downstream from the network asset 305. For example, the downstream score(s) 365 may be based on respective weakness scores of the network asset 310, the network asset 315, the network asset 320, the compromise event(s) 370, the network asset 325, the compromise event(s) 375, or any combination thereof.

The autonomous pentesting agent 105 may determine a context score 355 that is a combination of the weakness score 360 and the downstream score(s) 365. Determination of context scores may be described in greater detail elsewhere herein, including with reference to FIG. 4.

In some examples, the autonomous pentesting agent 105 may determine the context score 355 based on tags (e.g., annotations). For example, the autonomous pentesting agent 105 may receive client-specific tags that indicate priority levels of different assets within the network 110. As an example, the network 110 may include a database including sensitive data that is of critical importance for a client. The autonomous pentesting agent 105, during an autonomous pentest, may access the database and discover a vulnerability with a weakness score that is relatively low compared to other network assets discovered during the autonomous pentest. However, a context score may be added to increase the scoring (e.g., to a higher severity level), reflecting the significance of the asset based on client-specific annotations. In other words, the context score may be used to reflect the client-specific annotations indicative of priority levels of different network assets.

As used herein, a "high" priority level may be understood to be above a threshold priority level. Based on a client-specific tag indicating a high priority level for the network asset 310, the autonomous pentesting agent 105 may increase a score (e.g., relative to an initial score) of the network asset 310. Additionally, the autonomous pentesting agent 105 may increase the downstream score(s) 365 of the network asset 305 that includes the score of the network asset 310. In other words, increasing a score of a downstream network asset in accordance with a client-specific tag indicating a high priority level may also increase a context score of a corresponding upstream network asset.

Alternatively, a "low" priority level may be understood to be below a threshold priority level. Based on a client-specific tag indicating a low priority level for the network asset 325, the autonomous pentesting agent 105 may decrease a score (e.g., relative to an initial score) of the network asset 325. Additionally, the autonomous pentesting agent 105 may decrease the downstream score(s) 365 of the network asset 305 that includes the score of the network asset 310. In other words, decreasing a score of a downstream network asset in accordance with a client-specific tag indicating a low priority level may also decrease a context score of a corresponding upstream network asset.

The client-specific tags may be indicated before, during, or after autonomous pentesting. For example, the autonomous pentesting agent 105 may receive the client-specific tags before an autonomous pentest and score the network assets in accordance with the client-specific tags during the autonomous pentest. In another example, the autonomous pentesting agent 105 may receive the client-specific tags during the autonomous pentest and adjust scores of the network assets in accordance with the client-specific tags after they are received (e.g., and before providing a report with the scores). In yet another example, the autonomous pentesting agent 105 may receive the client-specific tags after the autonomous pentest (e.g., and after providing a report with the scores), modify the scores of the network assets, and provide an updated report with the modified scores.

In some examples, modifications of scores of network assets based on the client-specific tags may be reflected in a model (e.g., a DAG) of pentesting attack paths of an autonomous pentest. For example, the autonomous pentesting agent 105 may modify or update models of the pentesting attack path 330, the pentesting attack path 335, or a merged model of multiple pentesting attack paths of the autonomous pentest. The modified or updated models may reflect scores of each network asset that are updated according to the client-specific tags, which may be used by the autonomous pentesting agent 105 to determine context scores for each of the network assets.

Figure 4:
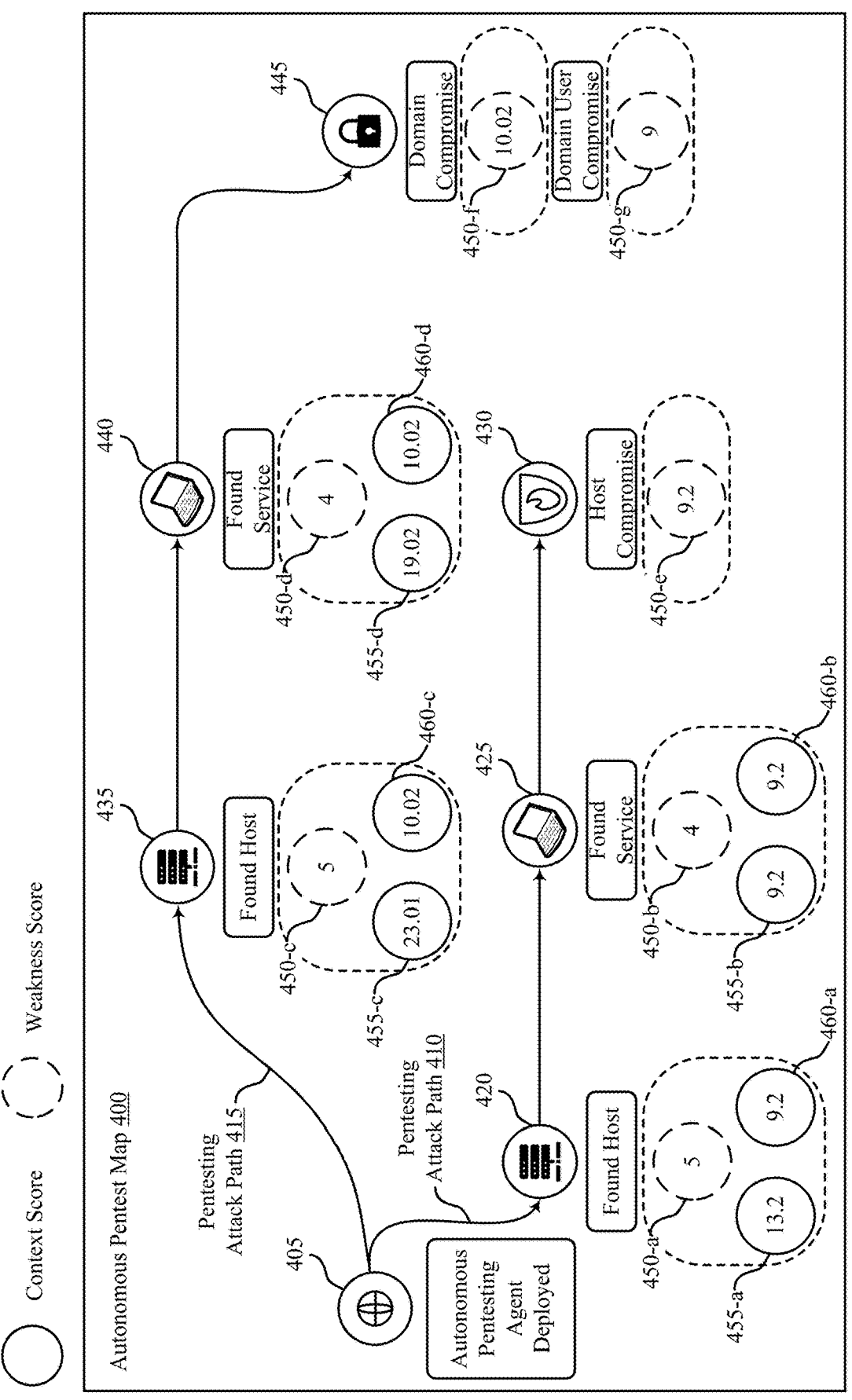
FIG. 4 shows an example of an autonomous pentest map that supports contextual weakness scoring during network pentesting in accordance with aspects of the present disclosure.

FIG. 4 shows an example of an autonomous pentest map 400. The autonomous pentest map 400 may be an example of an output or result of an autonomous pentest performed by an autonomous pentesting agent, such as a pentest performed by the autonomous pentesting agent 105 in the network 110 as described with reference to FIGS. 1 and 2. The autonomous pentest map 400 may illustrate and describe an example of events of a pentest, including operations performed by and information obtained by the autonomous pentesting agent.

The autonomous pentest map 400 may include a pentesting attack path 410 and a pentesting attack path 415. While two pentesting attack paths are included in the autonomous pentest map 400, it may be understood that any number of pentesting attack paths may be included in the autonomous pentest map 400. During the autonomous pentest, an autonomous pentesting agent (e.g., the autonomous pentesting agent 105) may be deployed 405 and may access network assets via one or more attack paths, including via the pentesting attack path 410 and via the pentesting attack path 415. For example, the pentesting attack path 410 may include host identification 420, service identification 425, and host compromise 430. The pentesting attack path 415 may include host identification 435, service identification 440, and domain and/or domain user compromise 445.

Each event in the autonomous pentest map 400 may correspond to different assets within a network, such as the network 110 as described with reference to FIGS. 1 and 3. As an example, the host identification 420 and the host identification 435 may be related to hosts of the network, while the service identification 425 and the service identification 440 may be related to services of the network. The assets corresponding to the events may be examples of network assets described herein, such as the network assets described with reference to FIGS. 1 and 3. The autonomous pentesting agent, during an autonomous pentest, may generate scores for the respective network assets in the network that are accessed during the pentest (e.g., identified or compromised).

The autonomous pentesting agent may generate, for each of the network assets that the autonomous pentesting agent gained access to during an autonomous pentest, scores that account for a context (e.g., context scores) of respective assets within the network. For example, each asset in the autonomous pentest map 400 may have a corresponding weakness score. For example, the host identification 420 may have a weakness score 450-*a*, the service identification 425 may have a weakness score 450-*b*, the host compromise 430 may have a weakness score 450-*c*, the host identification 435 may have a weakness score 450-*c*, the service identification 440 may have a weakness score 450-*d*, and the domain and/or domain user compromise 445 may have a weakness score 450-*f* and a weakness score 450-*g*, respectively.

Weakness scores may refer to a baseline or industry standard score associated with a given vulnerability as defined in a publicly available common vulnerabilities and exposures (CVE) database. For example, the CVE database may define weakness scores associated with different assets, vulnerabilities, or types of network compromise. The weakness scores may be independent of a context of a given asset within the network. As an example, the weakness score for the host identification 435 and the host identification 420 may be the same, although the host identification 435 leads to domain and/or domain user compromise 445 while the host identification 420 leads to host compromise 430 in the autonomous pentest map 400.

To account for context of each asset within the network, the autonomous pentesting agent may apply a context score in combination with the weakness scores for each respective asset. In other words, the context score may be applied on top of the weakness score. The context score may represent a downstream impact that may result from exploiting a weakness or vulnerability at a respective asset. The context score may be calculated as a summation of downstream impacts for a respective asset, a maximum downstream impact for the respective asset, or a quantity of downstream impact(s) translated into the context score.

For example, the autonomous pentesting agent may generate a context score 455-*a* and a context score 460-*a* for the host identification 420, a context score 455-*b* and a context score 460-*b* for the service identification 425, a context score 455-*c* and a context score 460-*c* for the host identification 435, and a context score 455-*d* and a context score 460-*d* for the service identification 440. The context scores 455 may represent cumulative scores (e.g., a summation of downstream impact), while the context scores 460 may represent maximum scores (e.g., a maximum downstream impact).

As an example, the context score 455-*a* of the host identification 420 may represent a summation of the weakness score 450-*b* and the weakness score 450-*e* of the service identification 425 and the host compromise 430, respectively, that are downstream from the host identification 420. Alternatively, the context score 460-*a* of the host identification 420 may represent a maximum of the weakness score 450-*b* and the weakness score 450-*e* of the downstream assets from the host identification 420. In examples in which the summation and the maximum are the same, the context score may be the same regardless of whether the autonomous pentesting agent calculates the context score as the summation or the maximum. For example, the service identification 425 may have a context score 455-*b* that is a summation of the weakness score 450-*e* and a context score 460-*b* that is a maximum of the weakness score 450-*e* (e.g., a summation or maximum of a single score is the same).

The autonomous pentesting agent may apply one or more of the scoring techniques (e.g., summation, maximum, combination). For example, the autonomous pentesting agent may output multiple reports corresponding to the different scoring techniques.

The autonomous pentest map 400 includes scores of some assets or compromise types that may be generated by the autonomous pentesting agent during an autonomous pentest. An exemplary list of asset or compromise types and associated weakness scores that may be generated by the autonomous pentesting agent and used to generate context scores is included below with reference to Table 1.

TABLE 1

| Name | Weakness Score | Description |
|---|---|---|
| Critical infrastructure compromise | 9.5 | Critical infrastructure includes key devices and applications that provide attackers a privileged position in the network from which they can access a relatively large amount of sensitive data and launch further attacks. |
| Domain compromise | 10.02 | After a domain is fully compromised, all hosts, domain user accounts, data, infrastructure, and applications tied to that domain may be considered fully compromised. Additionally, applications running on a domain-joined machine or any application that uses Active Directory integration to authenticate users may be considered fully compromised. |
| Domain user compromise | 9 | After a domain user is compromised, any assets that user account has access to may be considered compromised. |
| Host compromise | 9.2 | Host compromise may lead to attackers gaining access to sensitive information, maintaining persistence within a network, and obtaining lateral movement within multiple networks. |
| Perimeter breach | 9.2 | Perimeter breach may lead to attackers gaining access to an internal network from a public network (e.g., the Internet). |
| Sensitive data exposure | 7.2 | Sensitive data exposures may be used by attackers to obtain user credentials, personally identifiable information (PII), financial account data, and other business-critical information to further exploit or gain profit. |
| Brand compromise | 7.5 | Brand compromise covers ways in which an attacker may harm a reputation of a company by, for instance, defacing a company website, hosting malware off a company domain, or carrying out phishing attacks that appear to originate from the company. |

TABLE 1-continued

| Name | Weakness Score | Description |
|---|---|---|
| Ransomware exposure | 7.8 | Ransomware exposures may be used by attackers to obtain access to business-critical data stores, encrypt them with a secret key, and demand a ransom payment from a company before releasing the decryption key. Ransomware attacks may cause severe disruption to business operations, even after the ransom is paid, as data stores must be decrypted and affected services restored. |
| Cloud service compromise | 7.5 | Cloud service compromise may lead to attackers gaining access to cloud resources and sensitive information. |
| Cloud compromise | 10 | After a cloud account is fully compromised, all cloud resources, cloud services, and data that exists in that cloud account may be considered fully compromised. |
| Business email compromise | 9.8 | Business email compromise may allow attackers to send and receive emails under the guise of a user. Attackers may leverage email access to conduct business accounting fraud, conduct highly targeted phishing attacks, gain access to sensitive information, and elicit trusting coworkers to perform actions on their behalf. |
| Amazon Web Services (AWS) user/role compromise | 9 | After an AWS user or role is compromised, anything that user or role has access to including cloud resources, cloud services, and data may be considered compromised. |
| AWS full account compromise | 10 | After an AWS account is fully compromised, all cloud resources, cloud services, and data that exists in that AWS account may be considered fully compromised. |
| Azure active directory (AD) user compromise | 9 | After an Azure AD domain user is compromised, anything that Azure account has access to may be considered compromised. This may include access to typical AD services, information about the Azure AD environment, and even access to other Azure services. |
| Microsoft Entra user compromise | 9 | After a Microsoft Entra user is compromised, anything that user has access to may be considered compromised. This may include access to the Microsoft Entra tenant, Microsoft 365, and access to Azure subscriptions. |
| Microsoft Entra full tenant compromise | 10 | Once an Entra (e.g., AzureAD) tenant is fully compromised, any application, service, or resource that utilizes the Entra tenant for Identity and Access Management (IAM) may be considered compromised. This includes cloud services such as Microsoft 365 and Azure-hosted resources such as virtual machines or databases. |
| Third party SaaS user compromise | 9 | After a third party SaaS user is compromised, anything that user has access to may be considered compromised. This could include access to private messages, files, and other application specific items. |

Figure 5:
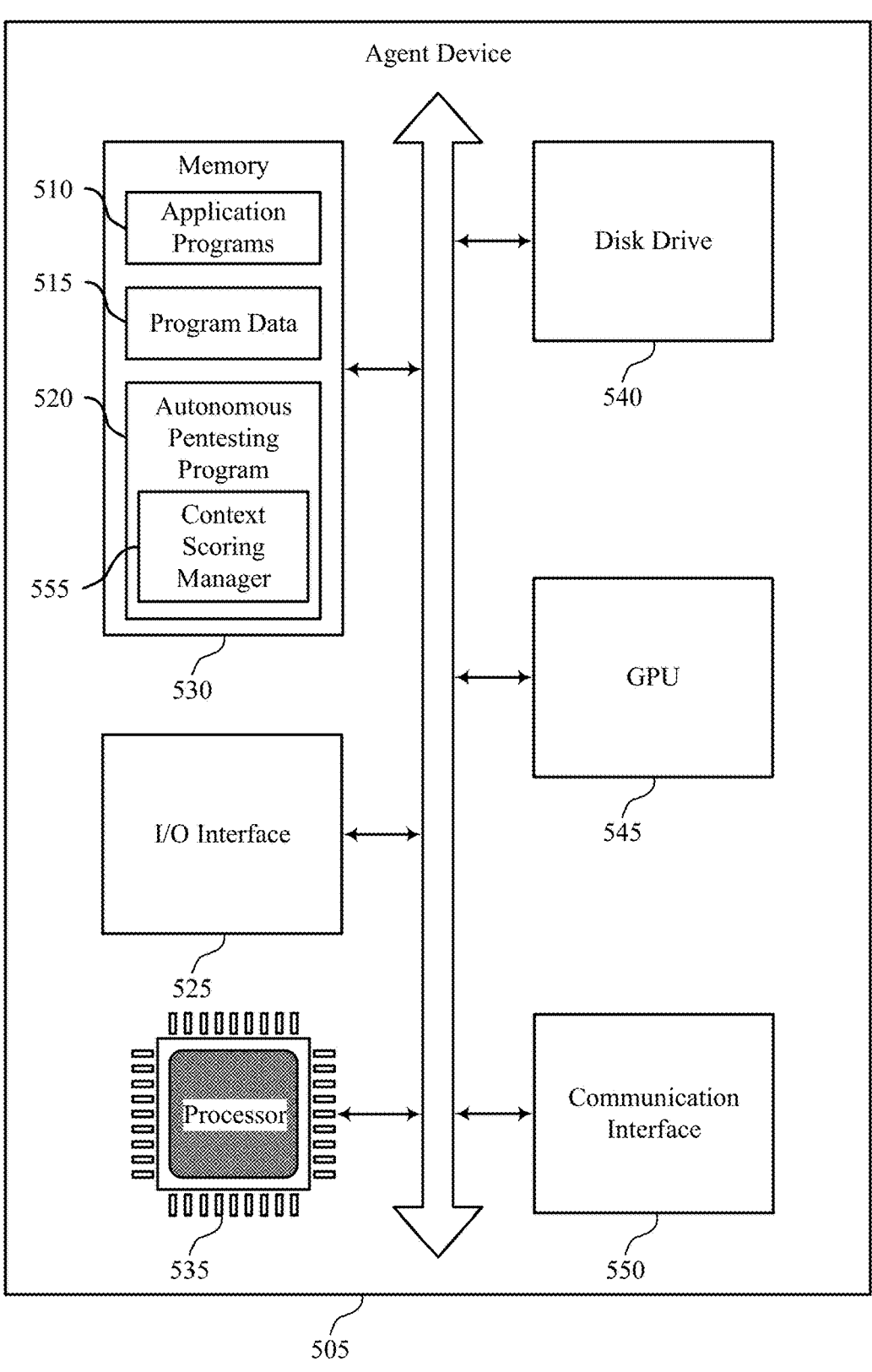
FIG. 5 shows a diagram of a system including a device that supports contextual weakness scoring during network pentesting in accordance with aspects of the present disclosure.

FIG. 5 shows a diagram of a system 500 including an agent device 505 that supports contextual weakness scoring during network pentesting in accordance with aspects of the present disclosure. The agent device 505 may be an example of a device or server on which an autonomous pentesting agent 105 is deployed as described herein. The agent device 505 may include components for contextual weakness scoring during network pentesting, such as a memory 530 including application programs 510, program data 515, an autonomous pentesting program 520, and a context scoring manager 555; an input/output (I/O) interface 525; a processor 535; a disk drive 540; a graphics processing unit (GPU) 545; and a communication interface 550. Each of these components may communicate, directly or indirectly, with one another (e.g., via one or more buses, communications links, communications interfaces, or any combination thereof).

The I/O interface 525 may support connection of the agent device 505 with one or more other devices. For example, the agent device 505 may connect to keyboards, mice, printers, hard disks, or the like via the I/O interface 525. The I/O interface 525 may communicate with the processor 535. That is, the processor 535 may process signals from devices connected to the agent device 505 via the I/O interface 525.

Memory 530 may include RAM, ROM, or both. The memory 530 may store computer-readable, computer-executable software including instructions that, when executed, cause at least one processor 535 to perform various functions described herein, such as functions supporting contextual weakness scoring during network pentesting. In some cases, the memory 530 may contain, among other things, a basic input/output system (BIOS), which may control basic hardware or software operation such as the interaction with peripheral components or devices. The memory 530 may be an example of a single memory or multiple memories. For example, the agent device 505 may include one or more memories 530.

The application programs 510 in the memory 530 may be examples of app(s) 140 as described with reference to FIG. 1. For example, the application programs 510 may be installed on the memory 530 of the agent device 505, among other devices in a network. The application programs 510 may be examples of software applications or computer programs that are implemented to carry out one or more functions or tasks.

The program data 515 may be data related to the application programs 510. Program data 515 may be an example of or refer to running data of programs and applications installed on the memory 530 of the agent device 505. In some examples, the program data 515 may include various data, including code that allows the application programs 510 to perform the one or more functions or tasks.

The processor 535 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 535 may be configured to execute computer-readable instructions stored in at least one memory 530 to perform various functions (e.g., functions or tasks supporting contextual weakness scoring during network pentesting). Though a single processor 535 is depicted in the example of FIG. 5, it is to be understood that the system 500 may include any quantity of one or more of processors 535 and that a group of processors 535 may collectively perform one or more functions ascribed herein to a processor, such as the processor 535. The processor 535 may be an example of a single processor or multiple processors. For example, the agent device 505 may include one or more processors 535.

The disk drive 540 may be configured to store data that is generated, processed, stored, or otherwise used by the system 500. In some cases, the disk drive 540 may include one or more hard disk drives (HDDs), one or more solid-state drives (SSDs), or both. In some examples, the disk drive 540 may be an example of a single database, a distributed database, multiple distributed databases, a data store, a data lake, or an emergency backup database. In some examples, the disk drive 540 may be an example of one or more components described with reference to FIG. 1.

GPU 545 may be configured to store graphics-related data. The GPU 545 may store and manage data related to graphics and video processing. In some examples, the GPU 545 may be an example of or a component of a graphics card. The GPU 545 may use components of the memory 530, including the RAM, for temporary storage. For example, the GPU 545 may move data from the RAM of the memory 530 to the GPU 545 for graphics and video processing.

The communication interface 550 may enable the agent device 505 to exchange information (e.g., input information, output information, or both) with other systems or devices (not shown). For example, the communication interface 550 may enable the agent device 505 to connect to a network (e.g., a network 110 as described herein). The communication interface 550 may include one or more wireless network interfaces, one or more wired network interfaces, or any combination thereof.

The autonomous pentesting program 520 may be an example of a program of an autonomous pentesting service that is installed on the memory 530 of the agent device 505. The autonomous pentesting program 520 may execute an autonomous pentest of a network accessed by the agent device 505, such as accessed via the communication interface 550. That is, the autonomous pentesting program 520 may be configured to perform an autonomous pentest as described herein, including an autonomous pentest involving autonomous context scoring.

The context scoring manager 555 may support context scoring in accordance with examples as disclosed herein. For example, the context scoring manager 555 may be configured as or otherwise support a means for executing an autonomous pentest of a network including multiple network assets, the multiple network assets including a first network asset and one or more additional network assets that are downstream from the first network asset within one or more attack paths of the autonomous pentest. Executing the autonomous pentest may include gaining unauthorized access to the first network asset and gaining unauthorized access to the one or more additional network assets based on gaining unauthorized access to the first network asset. The context scoring manager 555 may be configured as or otherwise support a means for generating, as part of the autonomous pentest, respective scores for the first network asset and the one or more additional network assets, where a first respective score for the first network asset is based on a first weakness score of the first network asset and on one or more additional weakness scores corresponding to the one or more additional network assets that are downstream from the first network asset. The context scoring manager 555 may be configured as or otherwise support a means for outputting, based on the autonomous pentest, a ranking of the multiple network assets based at least in part on the respective scores.

By including or configuring the context scoring manager 555 in accordance with examples as described herein, the agent device 505 may support techniques for improved network security.

FIG. 6 shows a flowchart illustrating a method 600 that supports contextual weakness scoring during network pentesting in accordance with aspects of the present disclosure. The operations of the method 600 may be implemented by an agent device 505 or its components as described herein. In some examples, an agent device may execute a set of instructions to control the functional elements of the agent device to perform the described functions. Additionally, or alternatively, the agent device may perform aspects of the described functions using special-purpose hardware.

At 605, the method may include executing an autonomous pentest of a network including multiple network assets, the multiple network assets including a first network asset and one or more additional network assets that are downstream from the first network asset within one or more attack paths of the autonomous pentest. In some examples, executing the autonomous pentest may include gaining unauthorized access to the first network asset and gaining unauthorized access to the one or more additional network assets based at least in part on gaining unauthorized access to the first network asset.

In some examples, the method may include modeling a first attack path of the one or more attack paths from the first network asset to a second network asset of the one or more additional network assets. Additionally, the method may include modeling a second attack path of the one or more attack paths from the first network asset to a third network asset of the one or more additional network assets. The method may include generating a representation of the one or more attack paths including at least the first attack path and the second attack path, where the generated representation indicates the one or more additional network assets that are downstream from the first network asset.

At 610, the method may include generating, as part of the autonomous pentest, respective scores for the first network asset and the one or more additional network assets, where a first respective score for the first network asset is based on a first weakness score of the first network asset and on one or more additional weakness scores corresponding to the one or more additional network assets that are downstream from the first network asset.

At 615, the method may include outputting, based on the autonomous pentest, a ranking of the multiple network assets based on the respective scores.

At 620, the method may include obtaining, after generating the respective scores, one or more client-specific tags that indicate one or more respective priority levels of one or more respective network assets within the network.

At 625, the method may include modifying the respective scores based on the one or more client-specific tags, where the modifying includes increasing or decreasing one or more scores of the respective scores in accordance with the one or more respective priority levels.

At 630, the method may include outputting a modified ranking of the multiple network assets based at least in part on the modified respective scores.

The following provides an overview of aspects of the present disclosure:

Aspect 1: A method for contextual weakness scoring, comprising: executing an autonomous pentest of a network comprising a plurality of network assets, the plurality of network assets comprising a first network asset and one or more additional network assets that are downstream from the first network asset within one or more attack paths of the autonomous pentest, wherein executing the autonomous pentest comprises: gaining unauthorized access to the first network asset; and gaining unauthorized access to the one or more additional network assets based at least in part on gaining unauthorized access to the first network asset; generating, as part of the autonomous pentest, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset; and outputting, based at least in part on the autonomous pentest, a ranking of the plurality of network assets based at least in part on the respective scores.

Aspect 2: The method of aspect 1, further comprising: modeling a first attack path of the one or more attack paths from the first network asset to a second network asset of the one or more additional network assets; modeling a second attack path of the one or more attack paths from the first network asset to a third network asset of the one or more additional network assets; and generating a representation of the one or more attack paths comprising at least the first attack path and the second attack path, wherein the generated representation indicates the one or more additional network assets that are downstream from the first network asset.

Aspect 3: The method of aspect 2, wherein the first attack path, the second attack path, the representation, or any combination thereof are modeled as DAGs.

Aspect 4: The method of any of aspects 2 through 3, further comprising: identifying the one or more additional network assets that are downstream from the first network asset using the representation of the one or more attack paths, wherein the first respective score is generated for the first network asset based at least in part on the one or more additional weakness scores after identifying the one or more additional network assets.

Aspect 5: The method of any of aspects 1 through 4, wherein the first weakness score and the one or more additional weakness scores are based at least in part on a CVE database.

Aspect 6: The method of any of aspects 1 through 5, wherein the first respective score comprises a combination of the first weakness score of the first network asset and a summation of the one or more additional weakness scores corresponding to the one or more additional network assets that are downstream from the first network asset.

Aspect 7: The method of any of aspects 1 through 6, wherein the first respective score comprises a combination of the first weakness score of the first network asset and a maximum weakness score of the one or more additional weakness scores corresponding to the one or more additional network assets.

Aspect 8: The method of any of aspects 1 through 7, wherein the first respective score is based at least in part on a quantity of the one or more additional network assets that are downstream from the first network asset.

Aspect 9: The method of any of aspects 1 through 8, further comprising: receiving, prior to executing the autonomous pentest, one or more client-specific tags that indicate one or more respective priority levels of one or more respective network assets within the network, wherein the respective scores are generated in accordance with the one or more respective priority levels of the one or more respective network assets.

Aspect 10: The method of aspect 9, wherein generating the first respective score comprises: generating an initial score of the first network asset based at least in part on the first weakness score of the first network asset and on the one or more additional weakness scores corresponding to the one or more additional network assets; and increasing the initial score to generate the first respective score of the first network asset based at least in part on the one or more client-specific tags that indicate a priority level above a threshold priority level for the first network asset.

Aspect 11: The method of any of aspects 9 through 10, wherein generating the first respective score comprises: generating an initial score of the first network asset based at least in part on the first weakness score of the first network asset and on the one or more additional weakness scores corresponding to the one or more additional network assets; and decreasing the initial score to generate the first respective score of the first network asset based at least in part on the one or more client-specific tags that indicate a priority level below a threshold priority level for the first network asset.

Aspect 12: The method of any of aspects 1 through 11, further comprising: obtaining, after generating the respective scores, one or more client-specific tags that indicate one or more respective priority levels of one or more respective network assets within the network; modifying the respective scores based at least in part on the one or more client-specific tags, wherein the modifying comprises increasing or decreasing one or more scores of the respective scores in accordance with the one or more respective priority levels; and outputting a modified ranking of the plurality of network assets based at least in part on the modified respective scores.

Aspect 13: The method of any of aspects 1 through 12, wherein the plurality of network assets comprises a critical infrastructure compromise, a domain compromise, a domain user compromise, a host compromise, a perimeter breach, a sensitive data exposure, a brand compromise, a ransomware exposure, a cloud service compromise, a cloud compromise, a business email compromise, a user or role compromise, a full account compromise, a directory user compromise, a full tenant compromise, a third-party user compromise, or any combination thereof.

Aspect 14: The method of any of aspects 1 through 13, wherein the respective scores are generated in real-time during the autonomous pentest.

Aspect 15: The method of any of aspects 1 through 14 further comprising: gaining, during the autonomous pentest and after generating the first respective score for the first network asset, unauthorized access to a third network asset that is downstream from the first network asset; and generating an updated first respective score for the first network asset based at least in part on a third weakness score of the third network asset.

Aspect 16: An apparatus for contextual weakness scoring, comprising one or more memories storing processor-executable code, and one or more processors coupled with the one or more memories and individually or collectively operable to execute the code to cause the apparatus to perform a method of any of aspects 1 through 15.

Aspect 17: An apparatus for contextual weakness scoring, comprising at least one means for performing a method of any of aspects 1 through 15.

Aspect 18: A non-transitory computer-readable medium storing code for contextual weakness scoring, the code comprising instructions executable by one or more processors to perform a method of any of aspects 1 through 15.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for contextual weakness scoring, comprising:
executing an autonomous penetration test of a network comprising a plurality of network assets, the plurality of network assets comprising a first network asset and one or more additional network assets that are downstream from the first network asset within one or more attack paths of the autonomous penetration test, wherein executing the autonomous penetration test comprises:
gaining unauthorized access to the first network asset; and
gaining unauthorized access to the one or more additional network assets based at least in part on gaining unauthorized access to the first network asset;
generating, as part of the autonomous penetration test, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset in accordance with identifying the one or more additional network assets within a first attack path and a second attack path of the one or more attack paths, wherein the first attack path is from the first network asset to a second network asset of the one or more additional network assets, and wherein the second attack path is from the first network asset to a third network asset of the one or more additional network assets; and
outputting, based at least in part on the autonomous penetration test, a ranking of the plurality of network assets based at least in part on the respective scores.

2. The method of claim 1, further comprising:
modeling the first attack path of the one or more attack paths from the first network asset to the second network asset of the one or more additional network assets;
modeling the second attack path of the one or more attack paths from the first network asset to the third network asset of the one or more additional network assets; and
generating a representation of the one or more attack paths comprising at least the first attack path and the second attack path, wherein the representation indicates the one or more additional network assets that are downstream from the first network asset.

3. The method of claim 2, wherein the first attack path, the second attack path, the representation, or any combination thereof are modeled as directed acyclic graphs (DAGs).

4. The method of claim 2, further comprising:
identifying the one or more additional network assets that are downstream from the first network asset using the representation of the one or more attack paths, wherein the first respective score is generated for the first network asset based at least in part on the one or more additional weakness scores after identifying the one or more additional network assets.

5. The method of claim 1, wherein the first weakness score and the one or more additional weakness scores are based at least in part on a common vulnerabilities and exposures (CVE) database.

6. The method of claim 1, wherein the first respective score comprises a combination of the first weakness score of the first network asset and a summation of the one or more additional weakness scores corresponding to the one or more additional network assets that are downstream from the first network asset.

7. The method of claim 1, wherein the first respective score comprises a combination of the first weakness score of the first network asset and a maximum weakness score of the one or more additional weakness scores corresponding to the one or more additional network assets.

8. The method of claim 1, wherein the first respective score is based at least in part on a quantity of the one or more additional network assets that are downstream from the first network asset.

9. The method of claim 1, further comprising:
receiving, prior to executing the autonomous penetration test, one or more client-specific tags that indicate one or more respective priority levels of one or more respective network assets within the network, wherein the respective scores are generated in accordance with the one or more respective priority levels of the one or more respective network assets.

10. The method of claim 9, wherein generating the first respective score comprises:
generating an initial score of the first network asset based at least in part on the first weakness score of the first network asset and on the one or more additional weakness scores corresponding to the one or more additional network assets; and
increasing the initial score to generate the first respective score of the first network asset based at least in part on the one or more client-specific tags that indicate a priority level above a threshold priority level for the first network asset.

11. The method of claim 9, wherein generating the first respective score comprises:
generating an initial score of the first network asset based at least in part on the first weakness score of the first network asset and on the one or more additional weakness scores corresponding to the one or more additional network assets; and decreasing the initial score to generate the first respective score of the first network asset based at least in part on the one or more client-specific tags that indicate a priority level below a threshold priority level for the first network asset.

12. The method of claim 1, further comprising:

obtaining, after generating the respective scores, one or more client-specific tags that indicate one or more respective priority levels of one or more respective network assets within the network;

modifying the respective scores based at least in part on the one or more client-specific tags, wherein the modifying comprises increasing or decreasing one or more scores of the respective scores in accordance with the one or more respective priority levels; and outputting a modified ranking of the plurality of network assets based at least in part on the modified respective scores.

13. The method of claim 1, wherein the plurality of network assets comprises a critical infrastructure compromise, a domain compromise, a domain user compromise, a host compromise, a perimeter breach, a sensitive data exposure, a brand compromise, a ransomware exposure, a cloud service compromise, a cloud compromise, a business email compromise, a user or role compromise, a full account compromise, a directory user compromise, a full tenant compromise, a third-party user compromise, or any combination thereof.

14. The method of claim 1, wherein the respective scores are generated in real-time during the autonomous penetration test.

15. The method of claim 1 further comprising:

gaining, during the autonomous penetration test and after generating the first respective score for the first network asset, unauthorized access to a third network asset that is downstream from the first network asset; and generating an updated first respective score for the first network asset based at least in part on a third weakness score of the third network asset.

16. An apparatus for contextual weakness scoring, comprising:

one or more memories storing processor-executable code; and one or more processors coupled with the one or more memories and individually or collectively operable to execute the code to cause the apparatus to:

execute an autonomous penetration test of a network comprising a plurality of network assets, the plurality of network assets comprising a first network asset and one or more additional network assets that are downstream from the first network asset within one or more attack paths of the autonomous penetration test, wherein, to execute the autonomous penetration test, the one or more processors are individually or collectively operable to execute the code to cause the apparatus to:

gain unauthorized access to the first network asset; and gain unauthorized access to the one or more additional network assets based at least in part on gaining unauthorized access to the first network asset;

generate, as part of the autonomous penetration test, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset in accordance with identifying the one or more additional network assets within a first attack path and a second attack path of the one or more attack paths, wherein the first attack path is from the first network asset to a second network asset of the one or more additional network assets, and wherein the second attack path is from the first network asset to a third network asset of the one or more additional network assets; and output, based at least in part on the autonomous penetration test, a ranking of the plurality of network assets based at least in part on the respective scores.

17. The apparatus of claim 16, wherein the one or more processors are individually or collectively further operable to execute the code to cause the apparatus to:

model the first attack path of the one or more attack paths from the first network asset to the second network asset of the one or more additional network assets;

model the second attack path of the one or more attack paths from the first network asset to the third network asset of the one or more additional network assets; and generate a representation of the one or more attack paths comprising at least the first attack path and the second attack path, wherein the representation indicates the one or more additional network assets that are downstream from the first network asset.

18. The apparatus of claim 17, wherein:

the first attack path, the second attack path, the representation, or any combination thereof are modeled as directed acyclic graphs (DAGs).

19. The apparatus of claim 17, wherein the one or more processors are individually or collectively further operable to execute the code to cause the apparatus to:

identify the one or more additional network assets that are downstream from the first network asset using the representation of the one or more attack paths, wherein the first respective score is generated for the first network asset based at least in part on the one or more additional weakness scores after identifying the one or more additional network assets.

20. A non-transitory computer-readable medium storing code for contextual weakness scoring, the code comprising instructions executable by one or more processors to:

execute an autonomous penetration test of a network comprising a plurality of network assets, the plurality of network assets comprising a first network asset and one or more additional network assets that are downstream from the first network asset within one or more attack paths of the autonomous penetration test, wherein the instructions to execute the autonomous penetration test are executable to:

gain unauthorized access to the first network asset; and gain unauthorized access to the one or more additional network assets based at least in part on gaining unauthorized access to the first network asset;

generate, as part of the autonomous penetration test, respective scores for the first network asset and the one or more additional network assets, wherein a first respective score for the first network asset is based at least in part on a first weakness score of the first network asset and on one or more additional weakness scores corresponding to the one or more additional network assets that are downstream from the first network asset in accordance with identifying the one or more additional network assets within a first attack path and a second attack path of the one or more attack paths, wherein the first attack path is from the first network asset to a second network asset of the one or more additional network assets, and wherein the second attack path is from the first network asset to a third network asset of the one or more additional network assets; and output, based at least in part on the autonomous penetration test, a ranking of the plurality of network assets based at least in part on the respective scores.

\* \* \* \* \*